United States Patent

[11] 3,634,169

| [72] | Inventor | Edward William Garnish |
| | | Saffron Walden, England |
| [21] | Appl. No. | 5,160 |
| [22] | Filed | Jan. 22, 1970 |
| [45] | Patented | Jan. 11, 1972 |
| [73] | Assignee | Ciba Limited |
| | | Basel, Switzerland |
| [32] | Priority | Jan. 24, 1969 |
| [33] | | Great Britain |
| [31] | | 4,310/69 |

[54] FILM ADHESIVES OF POLYVINYL CHLORIDE AND EPOXIDE RESINS
14 Claims, No Drawings

[52] U.S. Cl.................................................... 156/309,
117/126 GE, 117/126 GR, 117/138.8 N,
117/138.8 E, 117/161 ZB, 156/306, 156/330,
161/184, 161/185, 161/186, 260/2 EP, 260/30.6
R, 260/31.8 M, 260/31.8 EP, 260/37 EP, 260/41
R, 260/41 B, 260/41 AG, 260/41 C, 260/47 EP,
260/78.4 EP, 260/824 EP, 260/827, 260/830 R,
260/837 PV
[51] Int. Cl...................................................... C09j 7/00,
C08g 45/04

[50] Field of Search........................................... 260/836,
837 PV; 156/306, 309, 330

[56] References Cited
UNITED STATES PATENTS

| 2,795,565 | 6/1957 | Newey............................ | 260/836 |
| 3,259,597 | 7/1966 | Burger............................ | 260/837 |
| 3,301,919 | 1/1967 | Cenci............................. | 260/836 |

FOREIGN PATENTS

| 745,060 | 2/1956 | Great Britain................ | 260/837 |

*Primary Examiner*—Paul Lieberman
*Attorneys*—Harry Goldsmith, Joseph G. Kolodny and Mario A. Monaco ABSTRACT: A method of preparing a heat-curable film, suitable for use as an adhesive, which comprises:
  a. forming a layer of a liquid mixture of
    i. an epoxide resin,
    ii. a heat-curing agent therefor,
    iii. a plastisol containing, finely dispersed in a plasticizer, a vinyl chloride polymer, and
  b. heating the said layer such that the plastisol gels and the mixture forms a coherent film but the eposide resin remains curable.

FILM ADHESIVES OF POLYVINYL CHLORIDE AND EPOXIDE RESINS

This invention relates to the production of compositions in film form, to compositions so obtained, and to their use as adhesives.

Adhesives in film form have several advantages over liquid or particulate adhesive compositions. The user does not have to dispense, mix, and spread the components, nd the films can be cut to the shape of the joint to be manufactured and supplied in the exact thickness for optimum properties in the cured joint. These features aid production processes and inspection since spew and cleanup problems are reduced yet starved joints are avoided. Epoxide resin adhesive compositions are widely used; they can be formulated so that a mixture of the resin and curing agent has a long usable life, i.e., a long "pot-life," but can be cured rapidly on heating. However, such compositions are often liquids or pastes that cannot be used as coherent films.

It has now been found that certain liquid epoxide resin compositions can be converted into heat-curable films suitable for use as adhesives. The method herein provided for preparing such a film comprises:
a. forming a layer of a liquid mixture of
  i. an epoxide resin,
  ii. a heat-curing agent therefor,
  iii. a plastisol containing, finely dispersed in a plasticizer, a vinyl chloride polymer, and
b. heating the said layer such that the plastisol gels and the mixture forms a coherent film but the epoxide resin remains curable.

The present invention also provides, as an article of commerce, a heat-curable film prepared by such a method.

It is known to apply a poly(vinyl chloride) plastisol, sometimes with a polymerizable resin, to or between surfaces as a coating or as an adhesive and to heat the assembly so that the plastisol gels and the other resin component (if present) polymerizes. The polymerizable resin may be an epoxide resin and curing agent may be incorporated which may also serve to cross-link the vinyl chloride polymer. Further, it is known to prepare laminates by applying a film of a vinyl chloride polymer-plasticizer composition, which may be fully gelled, to a substrate, an adhesive layer of a polymerizable resin being interposed between the substrate and the film. The present invention on the other hand is directed to production of coherent, continuous films for subsequent use as adhesives.

The conditions under which a film is made depend on such factors as its thickness and the proportion of vinyl chloride polymer in the composition; typically the plastisol is gelled by heating at from 50° to 125° C., especially at between 65° and 105° C., for from 1 to 45 minutes, usually from 3 to 20 minutes.

Epoxide resins (i.e. substances containing on average more than one 1,2-epoxide group per molecule) suitable for forming the film adhesives include those wherein the epoxide groups are terminal, such as polyglycidyl esters obtainable by reaction of a substance containing two or more carboxylic acid groups with epichlorohydrin or glycerol dichlorohydrin in the presence of an alkali. Such polyglycidyl esters may be derived from aliphatic carboxylic acids, e.g., oxalic, succinic, adipic or sebacic acid, and dimerized or trimerized linoleic acid; from cycloaliphatic carboxylic acids such as hexahydrophthalic, methylhexahydrophthalic, tetrahydrophthalic, and methyltetrahydrophthalic acid and from aromatic carboxylic acids such as phthalic, isophthalic, and terephthalic acid.

There may also be used polyglycidyl ethers obtainable by reaction of a substance containing two or more alcoholic hydroxyl groups, or two or more phenolic hydroxyl groups, with epichlorhydrin or glycerol dichlorohydrin, either under alkaline conditions or in the presence of an acidic catalyst with subsequent treatment with alkali. the polyhydric alcohols may be aliphatic, for example ethylene glycol or diethylene glycol and higher poly(oxyethylene) glycols, propylene glycol and poly(oxypropylene) glycols, propane-1,3-diol, butane-1,4-diol, poly(oxybutylene) glycols, pentane-1,5-diol, hexane-1,6-diol, hexane-2,4,6-triol, glycerol, 1,1,1-trimethylolpropane, pentaerythritol, and poly(epichlorohydrin); cycloaliphatic, such as quinitol, resorcitol, bis(4-hydroxycyclohexyl)methane, 1,1-bis-(hydroxymethyl)cyclohex-3-ene, and 2,2-bis(4-hydroxycyclohexyl)propane; or they may contain aromatic nuclei, such as adducts of alkylene oxides with amines, e.g. N,N-bis(2-hydroxyethyl)aniline and 4,4'-bis(2-hydroxyethylamino)diphenylmethane, or with phenols, e.g., 2,2-bis(4-(2-hydroxyethoxy)phenyl) propane and 2,2-bis(4-hydroxypropoxyphenyl)propane. The polyhydric phenols may be mononuclear, for example resorcinol, catechol, and hydroquinone, or polynuclear, such as 4,4'-dihydroxydiphenyl, bis(4-hydroxyphenyl)methane, bis(4-hydroxyphenyl)sulfone, 2,2-bis(4-hydroxyphenyl)propane (otherwise known as bisphenol A), 2,2-bis(3,5-dibromo- and 3,5-dichloro-4-hydroxyphenyl)propanes, 1,1,2,2-tetrakis(4-hydroxyphenyl)ethane, and novolacs formed from aldehydes such as formaldehyde, acetaldehyde, chloral or furaldehyde with phenols such as phenol itself, p-chlorophenol, p-cresol, and p-tert. butylphenol.

There may further be employed poly(N-glycidyl) compounds obtainable by dehydrochlorination of the reaction products of epichlorohydrin and amines containing at least two hydrogen atoms directly attached to nitrogen such as aniline, n-butylamine, bis(4-aminophenyl)methane, bis(4-aminophenyl) sulfone, and bis(4-methylaminophenyl)methane, Other poly(N-glycidyl)compounds that may be used include triglycidyl isocyanurate, N,N'-diglycidyl derivatives of cyclic alkylene ureas such as ethyleneurea and 1,3-propyleneurea, and N,N'-diglycidyl derivatives of hydantoins such as 5,5-dimethylhydantoin.

Polyepoxides having terminal 1,2-epoxide groups attached to different kinds of atoms may be employed e.g. the N,N,O-triglycidyl derivative of p-aminophenol, or glycidyl esters—glycidyl ethers of substances such as alicylic acid, 4,4-bis(p-hydroxyphenyl)pentanoic acid or phenolphthalein.

Other epoxide resins which may be used include those wherein at least one epoxide is not terminal but is fused to a five- or six-membered carbocyclic ring, such as bis(2,3-epoxycyclopentyloxy)ethane, 2,3-epoxycyclopentyl glycidyl ether, 3,4-epoxycyclohexyl glycidyl ether, 3,4-epoxycyclohexylmethyl glycidyl ether, 4-oxatetracyclo[6.2.1.0$^{2,7}$0$^{3,5}$]undec-9-yl glycidyl ether, 3,4-epoxycyclohexylmethyl 3,4-epoxycyclohexanecarboxylate, 3,4-epoxy-6-methylcyclohexylmethyl 3,4-epoxy-6-methylcyclohexanecarboxylate, dicyclopentadiene dioxide, limonene dioxide, vinylcyclohexene dioxide, 3-(3,4-epoxycyclohexyl)-8,9-epoxy-2,4-dioxaspiro[5.5]undecane,3-(3,4-epoxy-6-methylcyclohexyl)-8,9-epoxy-11-methyl-2,4-dioxaspiro[5.5]undecane, and bis(3,4-epoxycyclohexyl)methyl adipate.

Preferred polyoxides are polyglycidyl ethers of polyhydric phenols or polyhydric alcohols, polyglycidyl esters of aromatic or cycloaliphatic polycarboxylic acids, and poly (N-glycidyl) derivatives of aromatic amines, especially those having a 1,2-epoxide content of at least 2 equivalents per kilogram.

The preferred heat-curing agents are those which are markedly latent, i.e. which exert an insignificant curing action on the epoxide resin until a suitably high threshold temperature is reached, such as dicyandiamide and the product obtained by reaction of approximately equimolecular proportions of phthalic anhydride and diethylenetriamine as described in British Pat. specification No. 1,121,196.

Other suitable latent curing agents are 1,3,5-triazines containing per molecule, at least two—NH$_2$ groups directly attached to carbon atoms of the triazine nucleus, such as melamine, N,N-diallylmelamine, guanamine, and adipoguanamine: and polycarboxylic acid polyhydrazides such as isophthalyl dihydrazide and sebacyl dihydrazide.

There may also be used a polycarboxylic acid anhydride as the heat-curing agent, used with an accelerator which is latent. As examples of polycarboxylic acid anhydrides may be mentioned phthalic anhydride, 1,2,3,6-tetrahydrophthalic anhydride, methyl 1,2,3,6-tetrahydrophthalic anhydride, methyl-1,2,3,6-tetrahydrophthalic anhydride, methylendomethylene-1,2,3,6-tetrahydrophthalic anhydride, hexachloroendomethylene-1,2,3,6-tetrahydrophthalic anhydride, hexahydrophthalic anhydride, maleic anhydride, succinic anhydride, nonenylsuccinic anhydride, dodecenylsuccinic anhydride, polysebacic anhydride, and polyazelaic anhydride.

Accelerators which may be used with polycarboxylic acid anhydrides include those compounds described in our United Kingdom specification No. 1,153,639, i.e., those containing, directly attached to a carbon atom in an aromatic nucleus, at least one radical of the formula

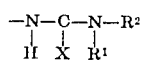

wherein $R^1$ is an alkyl, alkoxy, alkenyl, cycloalkyl, cycloalkenyl, or aralkyl group, which may be substituted by halogen, hydroxyl, or cyano, and $R^2$ is such a group or a hydrogen atom; or $R^1$ and $R^2$ taken together with the attached nitrogen atom are a heterocyclic ring; and X is oxygen or sulfur, not more than two such radicals of formula I being attached to any one aromatic nucleus.

Other accelerators which may be used with polycarboxylic acid anhydrides include those compounds described in our United Kingdom specification No. 1,132,380, viz those of formula

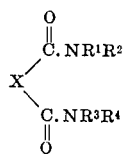

where X is either the radical $-CH_2(CH_2)_mCH_2-$ (where $m$ is 0 or 1), or a substituted or unsubstituted phenylene or cycloalkylene radical to which the two CO groups are bound through vicinal carbon atoms; and $R^1$, $R^2$, $R^3$ and $R^4$ each denotes a hydrogen atom, or an alkyl, alkenyl, cycloalkyl, cycloalkenyl, aryl or aralkyl group, which may be substituted by halogen, hydroxyl, or nitrile, and $R^1$ and $R^2$, or $R^3$ and $R^4$, but not both, may be linked together to form with the attached nitrogen atom a heterocyclic ring, at least one, but not more than three, of $R^1$, $R^2$, $R^3$ and $R^4$ being hydrogen. An example of such an accelerator is N-(o-(N'-(n-butyl)carboxamido)benzoyl)morpholine,

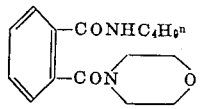

Sufficient heat-curing agent is employed to convert the epoxide resin into an insoluble, infusible, cross-linked product. The amount can readily be determined by routine experimentation using methods familiar to those skilled in the art.

The vinyl chloride polymer is preferably a homopolymer, including postchlorinated poly(vinyl chloride), but copolymers with vinyl acetate, or acrylonitrile and/or vinylidene chloride may also be used.

Conventional plasticisers may be employed to form the plastisol, e.g. dioctyl sebacate, dioctyl phthalate, dinonyl phthalate, tri(2-ethylhexyl)phosphate, trixylenyl phosphate, octyl diphenyl phosphate, butyl acetyl ricinoleate and benzyl n-butyl phthalate. For the best results, the plasticiser should be at least partially soluble in the epoxide resin, either during manufacture of the film or when the film is heated to cure the epoxide resin.

The proportion of vinyl chloride polymer plastisol may vary over a wide range, typically between 1 and 10 parts by weight of the plastisol per part by weight of epoxide resin.

The liquid mixtures which form the adhesives may contain fillers, in powder form such as aluminum powder or in fibrous form such as asbestos, glass or carbon fibers; flow-control agents, including silicones, amine-modified clays and silica of large specific surface area; stabilizers for the vinyl chloride polymer; and pigments and dyestuffs.

Films can be made in a conventional manner, generally in a heated press or by applying a film with a doctor blade onto a surface to be heated: the mixture to be formed into a film may be heated indirectly, such as by infrared lamps. The film may be formed on a supporting sheet of e.g., polythene, nylon, or glass fibers, or around a woven carrier material. Usually the films are made from 0.1 to 2 mm. thick. To bond together two surfaces, the film is cured while sandwiched between, and in contact with, the two surfaces.

The following examples illustrate the invention. Parts and percentages are by weight.

EXAMPLES 1–10

The following epoxide resins were employed.

"Epoxide resin A" denotes a polyglycidyl ether of 2,2-bis(4-hydroxyphenyl)propane, having a viscosity at 21° C. of between 200 and 400 poises and a 1,2-epoxide content of between 5.0 and 5.2 equivalents per kilogram. "Epoxide resin B" denotes a polyglycidyl ether of a novolac resin which had been prepared by reaction of phenol and formaldehyde in a molar ratio of 1:0.57 : it had a softening point (ball and ring method) within the range 35° to 48° C. and 1,2-epoxide content of between 5.4 and 5.8 equivalents per kilogram. "Epoxide resin C" denotes a poly(N-glycidyl)compound prepared from bis(4-aminophenyl)methane and epichlorohydrin, it was highly viscous liquid having a 1,2-epoxide content in the range 7.8 to 8.2 equivalents per kilogram.

The poly(vinyl chloride) was that obtained from Imperial Chemical Industries under the designation "Corvic P65/54."

"Hardener I" was prepared from 59 parts of phthalic anhydride and 41 parts of diethylenetriamine as described in example 1 of British Pat. specification No. 1,121,196: it softened at about 102° C. and contained 7.4 percent amino nitrogen.

The compositions were prepared by mixing the components, either by hand or preferably in a roller mill, then they were spread on a platen in a heated press and heated under nominal pressure.

Aluminum alloy sheets, 1.63 mm. thick and available under the designation "2L 73 Alclad," were degreased, pickled as prescribed in the British Ministry of Aviation Aircraft Process Specification DTD–915 B, washed in running water, and dried. Single lap joints, 2.54 cm. wide with 1.27 cm. overlap were prepared with the film adhesive interposed, and the assemblies were heated for 1 hour at 180° C. under a pressure of 3.5 kiloponds per square cm. to cure the adhesive. Shear strengths at room temperature (about 20° C.) of the bonds obtained are shown in table II, each value being the mean of four determinations.

EXAMPLES 11–17

In these examples the poly(vinyl chloride) was "Corvic P65/54," or "Norvinyl P.10" and "Norvinyl P.12" obtained from Norsk Hydro-Elektrisk Kvaelstofaktieselskab, Oslo. Compositions were prepared as in examples 1 to 10, from the components listed in table III, and these were used to bond aluminum alloy sheets as described for examples 1 to 10. Shear strengths of the bonds obtained are also shown in Table III. "Accelerator A" in that table denotes N-(o-(N'-(n-butyl)carboxamido)benzoyl)morpholine.

TABLE I

| | Example Number | | | | | | | | | |
|---|---|---|---|---|---|---|---|---|---|---|
| | 1 | 2 | 3 | 4 | 5 | 6 | 7 | 8 | 9 | 10 |
| Epoxide resin A | 100 | 100 | 100 | 100 | 100 | 100 | | | | |
| Epoxide resin B | | | | | | | 100 | 100 | | |
| Epoxide resin C | | | | | | | | | 100 | 100 |
| Dicyandiamide | 20 | 20 | 20 | 20 | 20 | | 20 | 20 | 20 | 20 |
| Hardener I | | | | | | 35 | | | | |
| Poly(vinyl chloride) | 800 | 800 | 160 | 160 | 160 | 160 | 80 | 800 | 80 | 800 |
| Benzyl n-butyl phthalate | 300 | | | | | 60 | 30 | 300 | 30 | 300 |
| Dioctyl sebacate | | 300 | 60 | | | | | | | |
| Dinonyl phthalate | | | | 60 | | | | | | |
| Trixylenyl phosphate | | | | | 60 | | | | | |
| Film forming conditions, minutes at °C | 5–70 | 3–95 | 6–95 | 8–95 | 8–95 | 8–95 | 10–100 | 5–80 | 15–100 | 5–80 |
| Nature of film | (1) | (1) | (1) | (1) | (1) | (1) | (2) | (3) | (2) | (3) |
| Thickness of film (mm.) | 0.75 | 0.3 | 0.52 | 0.42 | 0.32 | 0.62 | 0.5 | 0.8 | 0.5 | 0.52 |

[1] Dry flexible.
[2] Slightly tacky.
[3] Dry, tough.

TABLE II

| | Example Number | | | | | | | | | |
|---|---|---|---|---|---|---|---|---|---|---|
| | 1 | 2 | 3 | 4 | 5 | 6 | 7 | 8 | 9 | 10 |
| Shear strength (kp./square cm.) | 290 | 260 | 230 | 270 | 320 | 300 | 320 | 290 | 310 | 260 |

TABLE III

| | Example Number | | | | | | |
|---|---|---|---|---|---|---|---|
| | 11 | 12 | 13 | 14 | 15 | 16 | 17 |
| Epoxide resin A | 100 | 100 | 100 | 100 | 100 | 100 | 100 |
| Dicyandiamide | | | | | 20 | 20 | |
| N,N-diallylmelamine | 40 | 40 | | | | | |
| Isophthalyl dihydrazide | | | 25 | | | | |
| Phthalic anhydride | | | | 80 | | | |
| Dodecenylsuccinic anhydride | | | | | | | 130 |
| Accelerator I | | | | | 1 | | 2 |
| "Corvic P.65/54" | 800 | 160 | 160 | 160 | | | 800 |
| "Norvinyl P.10" | | | | | 160 | | |
| "Norvinyl P.12" | | | | | | 160 | |
| Benzyl n-butyl phthalate | 300 | | | | | | 300 |
| Dinonyl phthalate | | 60 | 60 | 60 | 60 | 60 | |
| Film forming conditions, minutes at °C | 5–70 | 8–95 | 8–95 | 8–95 | 8–95 | 8–95 | 5–70 |
| Nature of film | (1) | Dry | Dry | Dry | Dry | Dry | (1) |
| Shear strength (kp./square cm.) | 134 | 260 | 231 | 146 | 206 | 229 | 60 |

[1] Slightly tacky.

I claim:

1. A method of bonding together two surfaces which comprises
   a. sandwiching between, and in contact with, the two surfaces a coherent, heat-curable film comprising
      i. one part by weight of a curable epoxide resin containing more than one 1,2-epoxide group per molecule,
      ii. sufficient latent heat-curing agent therefor to convert the epoxide resin into an insoluble, infusible, cross-linked product, and
      iii. from one to 10 parts by weight of a gelled plastisol containing a vinyl chloride polymer finely dispersed in a plasticizer, and
   b. curing the film.

2. Method according to claim 1 wherein the coherent, heat-curable film is prepared by
   a. forming a layer of a liquid mixture of
      i. one part by weight of an epoxide resin containing more than one 1,2-epoxide group per molecule,
      ii. a latent heat-curing agent therefor, and
      iii. one to 10 parts by weight of a plastisol containing, finely dispersed in a plasticizer, a vinyl chloride polymer, and
   b. heating the said layer at from 50° to 125° C. for from 1 to 45 minutes, so that the plastisol gels and the mixture forms a coherent film but the epoxide resin remains curable.

3. Method according to claim 2 wherein the liquid mixture is heated at between 65° and 105° C.

4. Method according to claim 2 wherein the liquid mixture is heated for from 3 to 20 minutes.

5. Method according to claim 1 wherein the epoxide resin is selected from the group consisting of polyglycidyl ethers of polyhydric phenols, polyglycidyl ethers of polyhydric alcohols, polyglycidyl esters of aromatic polycarboxylic acids, polyglycidyl esters of cycloaliphatic polycarboxylic acids, and poly(N-glycidyl) derivatives of aromatic amines.

6. Method according to claim 5 wherein the epoxide resin has a 1,2-epoxide content of at least 2 equivalents per kilogram.

7. Method according to claim 1 wherein the vinyl chloride polymer is a homopolymer.

8. Method according to claim 1 wherein the vinyl plasticizer is at least partially soluble in the epoxide resin when the film is heated to cure the epoxide resin.

9. Method according to claim 1 wherein the latent heat-curing catalyst is selected from the group consisting of dicyandiamide, and the products obtained by reaction of equimolecular proportions of phthalic anhydride and diethylenetriamine.

10. Method according to claim 1 wherein the latent heat-curing agent is selected from the group consisting of 1,3,5-triazines containing, per molecule, at least two —NH$_2$ groups attached to the triazine nucleus, and polycarboxylic acid polyhydrazides.

11. Method according to claim 10 wherein the latent heat-curing agent is selected from the group consisting of melamine, N,N-diallylmelamine, guanamine, adipoguanamine, isophthalyl dihydrazide, and sebacyl dihydrazide.

12. Method according to claim 1 wherein the latent heat-curing agent is a polycarboxylic acid anhydride used with an accelerator which is latent.

13. Method according to claim 12 wherein the accelerator is a compound containing, directly attached to a carbon atom in an aromatic nucleus, at least one residue of the formula

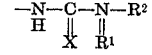

wherein $R^1$ and $R^2$, taken together with the nitrogen atom to which they are attached, denote a heterocyclic ring and, taken separately, $R^1$ is selected from the group consisting of alkyl, substituted alkyl, alkoxy, substituted alkoxyl, alkenyl, substituted alkenyl, cycloalkyl, substituted cycloalkyl, aralkyl and substituted aralkyl groups, and $R^2$ is independently selected from the group consisting of the same group as $R^1$ and hydrogen atoms, the substituents being selected from the group consisting of halogen atoms and hydroxyl and nitrile groups, X represents an atom selected from the group consisting of oxygen and sulphur atoms, at most two such radicals being attached to any one aromatic nucleus.

14. Method according to claim 12 wherein the accelerator is a compound of formula

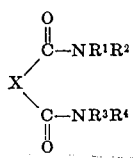

wherein X is selected from the group consisting of phenylene and cycloalkylene, to which the two indicated CO groups are bound through vicinal carbon atoms, —$CH_2CH_2$—, and —$CH_2CH_2CH_2$—, $R_1$ and $R_2$, taken together with the attached nitrogen atom, form a heterocyclic ring and, taken separately, are selected from the group consisting of hydrogen atoms and alkyl, substituted alkyl, alkenyl, substituted alkenyl, cycloalkyl, substituted cycloalkyl, cycloalkenyl, substituted cycloalkenyl, aryl, substituted aryl, aralkyl and substituted aralkyl groups, the substituents being selected from the group consisting of halogen atoms, hydroxy, and nitrile groups, $R^3$ and $R^4$ are selected from the group consisting of hydrogen atoms and alkyl, substituted alkyl, alkenyl, substituted alkenyl, cycloalkyl, substituted cycloalkyl, cycloalkenyl, substituted cycloalkenyl, aryl, substituted aryl, and aralkyl and substituted aralkyl groups, the substituents being selected from the group consisting of halogen atoms, hydroxy, and nitrile groups, $R^1$, $R^2$, $R^3$ and $R^4$ being selected so that at least one and not more than three of $R^1$, $R^2$, $R^3$ and $R^4$ each represent a hydrogen atom.

* * * * *